United States Patent [19]
Takayama et al.

[11] Patent Number: 6,161,908
[45] Date of Patent: Dec. 19, 2000

[54] DRIVE BELT SUSPENSION FOR SNOWMOBILE

[75] Inventors: Tadashi Takayama; Kaoru Haruna; Takahiko Kubota, all of Iwata, Japan

[73] Assignee: Yamaha Hatsudoki Kabushiki Kaisha, Iwata, Japan

[21] Appl. No.: 09/292,106

[22] Filed: Mar. 1, 1999

[30]     Foreign Application Priority Data

Feb. 8, 1998  [JP]  Japan .................................. 10-048232
Mar. 17, 1998 [JP]  Japan .................................. 10-088089

[51] Int. Cl.⁷ .................................................. B62D 55/00
[52] U.S. Cl. ......................................... 305/124; 305/128
[58] Field of Search ............................ 305/124, 127, 305/128, 129, 139; 180/190, 193, 9.52, 9.56

[56]                 References Cited
              U.S. PATENT DOCUMENTS 3,613,811  10/1971  Brandli ................................ 305/127
3,690,394   9/1972  Skime .................................. 305/127
3,933,213   1/1976  Trowbridge ........................... 180/193
4,093,033   6/1978  Rosch .................................. 305/127
4,301,884  11/1981  Taylor ................................. 180/190
4,305,476  12/1981  Blass et al. ......................... 180/9.54
4,314,618   2/1982  Tamura ............................... 180/9.56
4,407,386  10/1983  Yasui et al. .
4,987,965   1/1991  Bourret .
5,692,579  12/1997  Peppel et al. ........................ 305/127
5,860,486   1/1999  Boivin et al. ........................ 180/190
5,944,134   8/1999  Peppel et al. ........................ 180/193

*Primary Examiner*—S. Joseph Morano
*Assistant Examiner*—Long Bao Nguyen
*Attorney, Agent, or Firm*—Knobbe, Martens, Olson & Bear LLP

[57]                ABSTRACT

An adjustment structure for the cushion unit of a snowmobile suspension system. The adjustment arrangement includes a mounting for the cushioning unit that is defined by a bolt and a pair of mount brackets having guide apertures formed therein. The bolt and guide aperture surfaces are treated so as to avoid shifting of the mechanism under the weight of the snowmobile when the mounting bolt is loosened for adjustment purposes.

6 Claims, 8 Drawing Sheets

DRIVE BELT SUSPENSION FOR SNOWMOBILE

DETAILED DESCRIPTION OF THE INVENTION

1. Field of the Invention

The present invention relates to a mounting position adjustment structure for a cushion unit, more particularly to a more effective adjustment structure for the cushion unit that is utilized for the suspension unit of a snow mobile driven by a track belt.

2. Background of the Invention

In the snow mobile operated on a snowy ground surface by driving the track belt, a pair of slide rails for guiding the bottom surface (contact surface) of the track belt is rockingly suspended in forward/rear sides of the vehicle body by means of front/rear suspension units relative to a body frame located in an upper side of the slide rail. In this type of snow mobile, the rear suspension unit is comprised of a link mechanism and cushion unit. The cushion unit of the rear suspension unit is conventionally structured that one end is mounted relative to a side of the body frame by means of an axis supported in the body frame while the other end is mounted relative to a side of the slide rails by means of a cross member provided across the pair of slide rails.

For such a cushion unit mounted across the body frame side and slide rail side, spring constant (reaction force) at the rear side of the contact surface of the track belt is adjusted depending on load weight (weight of passengers or luggage) by adjusting the mounting position of the cushion unit at the side of the cross member of the slide rail.

However, in such a conventional adjustment structure of the cushion unit, it is necessary to loosen or fasten screws at both ends of the cross member that are respectively secured in the left/right slide rails. Thus, if only one operator performs the adjustment job, he or she has to go over to the other side after one side is taken care of, and it is very inconvenient. Furthermore, since the adjusting area is very close to the snowy ground, the area is highly likely covered by snow after driving the snow mobile. Thus, the operator has to remove the snow every time before he or she performs the adjustment, resulting in low work efficiency.

In order to solve this problem, Patent Applicant has already designed a prior invention (Japanese Patent Application No. 7-312968). In this prior art invention, the cushion unit of the rear suspension unit located in a space that is enclosed by the track belt is located in a vicinity of the upper inner part of the track belt in a substantially center of the cross-direction of the vehicle body; and, an axis member by which an end part of the cushion unit is journaled is movably secured relative to a pair of mount brackets at least at one side of the cushion unit, wherein the axis member is secured by means of one bolt axis for supporting the axis member and adjustment guide apertures that are respectively provided for the pair of mount brackets for penetrating the bolt axis, whereby the mounting position of the cushion unit is accomplished.

SUBJECT TO BE SOLVED BY THE PRESENT INVENTION

According to the cushion unit adjustment structure for the snow mobile invented by Patent Applicant, nuts in the bolt axis that are inserted relative to the adjustment guide apertures of the pair of mount brackets are first loosened. Then, after the bolt axis is shifted inside the adjustment guide apertures, the nuts are again fastened in the bolt axis. The axis member supported by the bolt axis is then secured relative to the pair of mount brackets. Thus, the mount position adjustment for the cushion unit can be easily performed from one side of the vehicle body. Furthermore, since the adjustment area is distanced from the snowy ground surface, it is more work efficient compared with the conventional invention.

However, in such a cushion unit adjustment structure, when adjusting the mount position of the cushion unit when the snow mobile is in an upright position, compression reaction force of the cushion unit generated by the weight of the vehicle body above the cushion unit is applied to the contact surface between the adjustment guide apertures and bolt axis. Thus, it requires quite strength to move the bolt axis inside the adjustment guide apertures against the compression reaction force of the cushion unit. This is a very difficult task.

Namely, there is no problem if the snow mobile is turned its side up, meaning that the weight of the vehicle body is not applied to the cushion unit. However, this is not always possible depending on types of the snow mobile or work circumstance. In such a case, the above problem resurfaces.

With respect to this disadvantage, it has been suggested that, even if the snow mobile is in the upright position, use of a control rod for setting the rocking motion of the slide rail within a predetermined range can eliminate an influence of the compression force applied to the cushion unit by securing the control rod in its fully-extended position, whereby the mounting position for the cushion unit is adjusted.

However, during the adjustment operation, the cushion unit often cannot be set in the fully extended state (in which there is no compression force is applied) because the control rod is already fully extended. Furthermore, even if the cushion unit is fully extended by securing the control rod at its fully extended state, it still requires enormous strength to maintain its position. Thus, it is very inconvenient if the operator is the only one who is performing the job at the time.

Furthermore, it is very important to determine where to set an extension range for the control rod. Once the range is changed, there is a concern that the extension range cannot be properly returned to the original one. Thus, it is not preferable that a user freely adjusts the control rod, and if possible, it should be avoided.

The present invention is designed to solve the above-described problems. More particularly, it is an object of the present invention to adjust the mount position of the cushion unit more easily without requiring an enormous force against the compression force while the compression reaction force is still applied to the mount part of the cushion unit, even by taking advantage of the compressing reaction force of the cushion unit.

SUMMARY OF THE INVENTION

In order to solve the above problems, as described in claim 1, the present invention provides an adjustment structure for a cushion unit, wherein at least in one end side of said cushion unit, an axis member for supporting an end part of said cushion unit is movably mounted relative to a pair of mount brackets by a bolt axis supporting said axis member and adjustment guide apertures formed in each mount bracket for penetrating said bolt axis so that a position of said cushion unit is adjustable, it is characterized that a treatment is respectively given in a contact surface between said adjustment guide apertures and bolt axis to which compression reaction force of the cushion unit is applied so as to prevent the skidding of said bolt axis relative to said apertures.

Furthermore, as described in claim 2, the adjustment structure for a cushion unit of claim 1 is further characterized that said cushion unit mounted through said axis member that allows the positional adjustment at least in one end side is a rear suspension unit in a snow mobile, wherein slide rails for guiding an inner bottom side of a track belt are suspended by means of front/rear suspension units relative to a body frame located in an upper side of said slide rails, and said cushion unit of said rear suspension unit is located in a vicinity of an upper inner side of said track belt.

Moreover, as described in claim 3, in the adjustment structure for a cushion unit of claim 2, in a side view, said cushion unit is located in a vicinity of the upper inner side of said track belt so that at least its upper side is covered by said body frame, and said adjustment guide apertures and bolt axis for adjusting the position of said cushion unit are located in the lower side of said body frame and arranged to face the side of the vehicle body.

DETAILED DESCRIPTION OF THE PREFERRED EMBODIMENTS

In the following, the preferred embodiment of the adjustment structure for the cushion unit is described in reference to the drawings.

Figure 1:
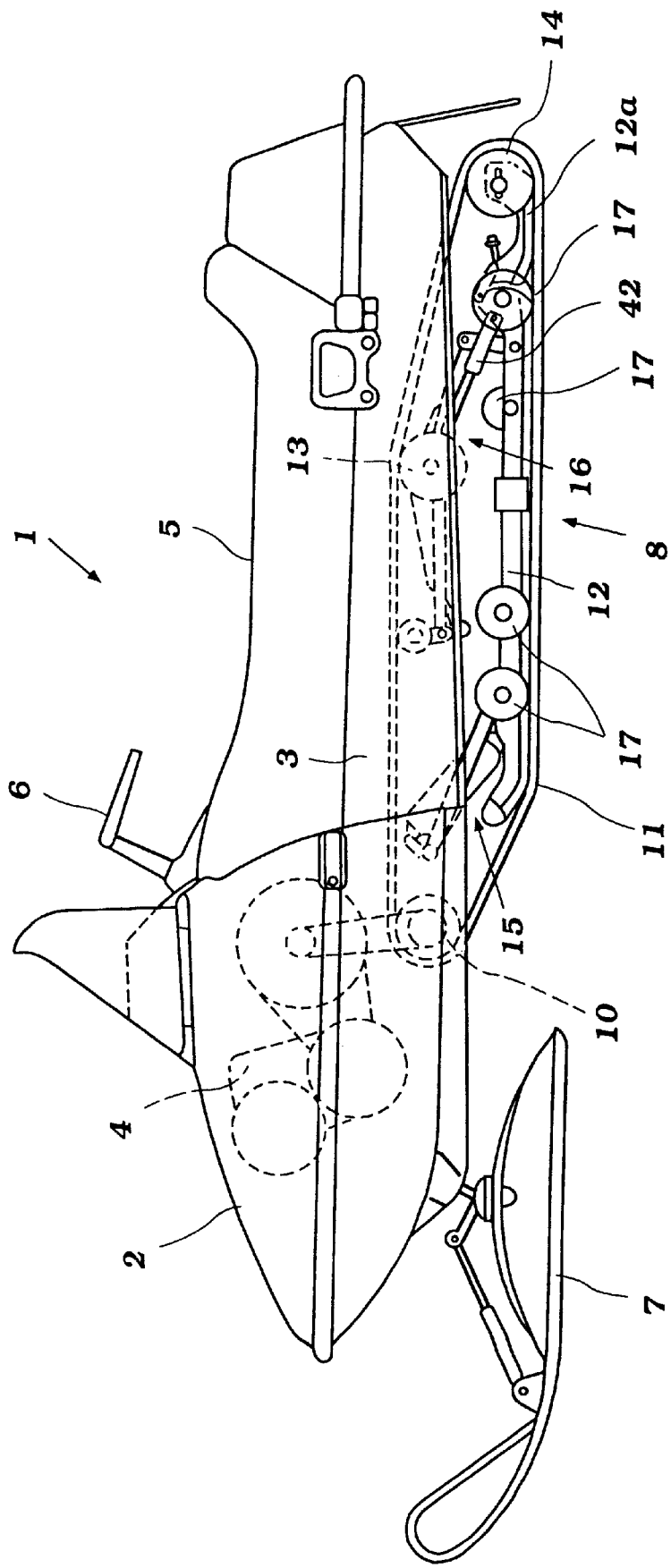
FIG. 1 is a side view illustrating one embodiment of the snow mobile to which the cushion unit adjustment structure in the present invention is employed.

FIG. 1 illustrates a schematic view of the snow mobile to which the cushion unit adjustment structure in the present invention is embodied. The snow mobile 1 is covered by a resin-made cowling 2 in which an engine 4 is loaded in a forward side of a body frame 3. A seat 5 is provided above the body frame 3 at a rear side of the cowling 2. A handle 6 is provided in front of the seat 5. A ski 7 operated by the handle 6 is provided in a vicinity of the front end of the vehicle body. A drive track 8 unit driven by the engine 4 is located below the body frame 3 at the rear side of the ski 7.

The drive track unit 8 consists of: drive sprockets 10 that rotate along with the revolution of the engine 4; an endless track belt 11 powered by the drive sprockets 10; a pair of slide rails 12 for guiding an inner bottom surface (back side of the contacting surface) of the track belt 11; guide wheels 13 for guiding the upper part of the track belt 11 at the rear side of the drive sprockets 10; guide wheels 14 for guiding the lower rear end part of the track belt 11 at the rear side of the slide rails 12; and suspension units 15 and 16 for suspending the slide rails 12 onto the body frame 3.

In the drive track unit 8, the drive sprockets 10 and guide wheels 13 are journaled at a side of the body frame 3. The guide wheels 14 are journaled at a side of the slide rails 12. Furthermore, in the slide rails 12, plural idler wheels 17 are provided at certain locations so as to reduce friction between the track belt 11 and slide rails 12 at the contact places by providing some non-contact places between them.

Figure 2:
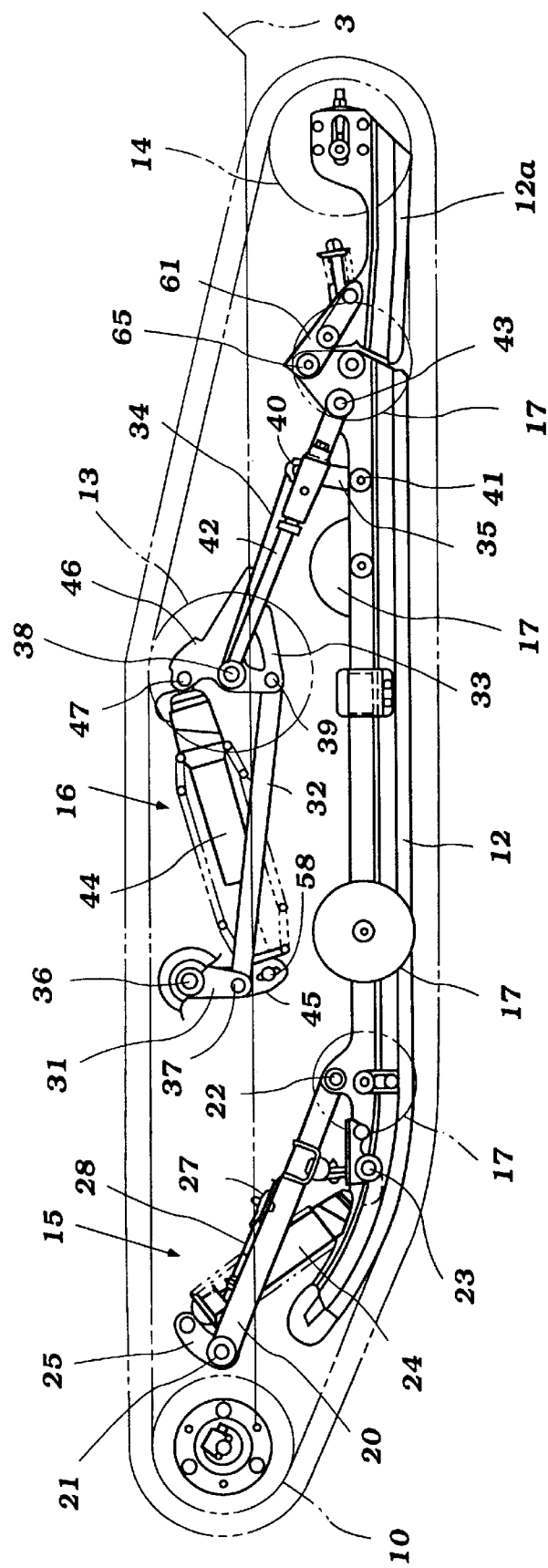
FIG. 2 is a side view illustrating the slide rail and its suspension units in the drive track of the snow mobile.
Figure 3:
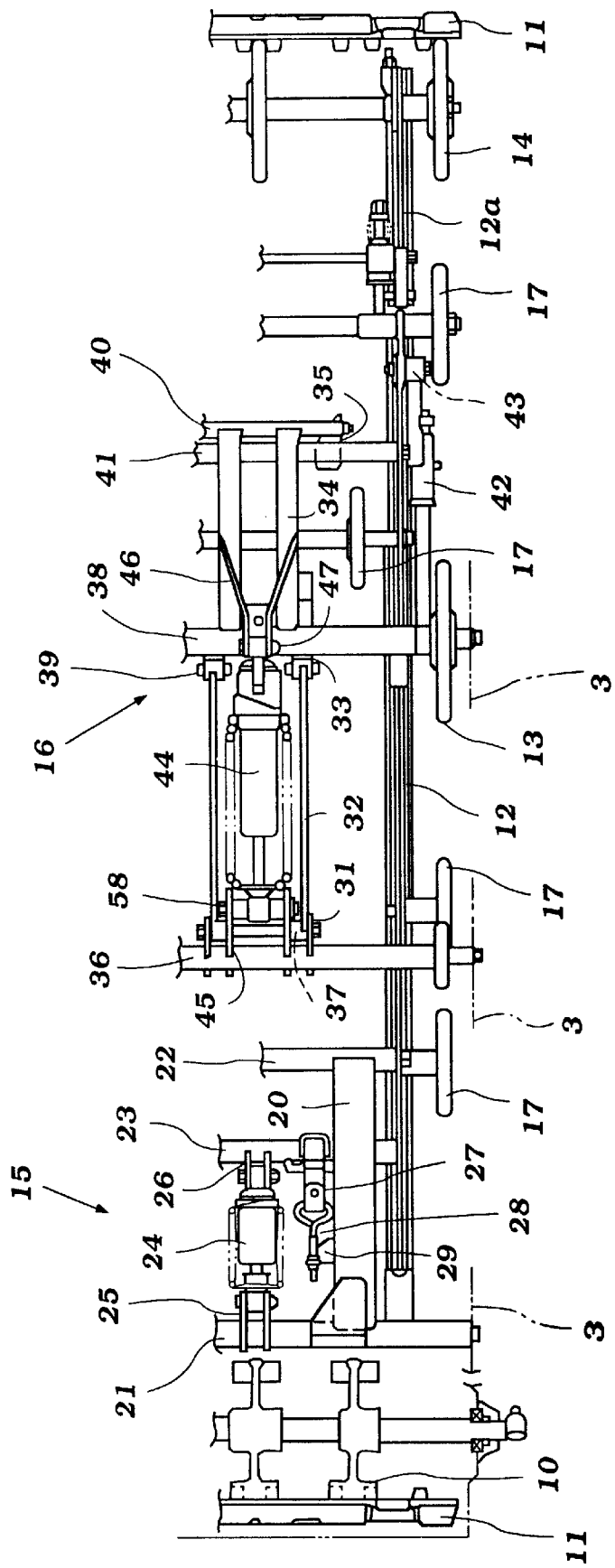
FIG. 3 is a top view illustrating the left half side of the vehicle body with respect to the slide rail and suspension units as described in FIG. 2.

FIGS. 2 and 3 illustrate the slide rails 12 and suspension units 15 and 16 in details at the drive track unit 8 of the snow mobile 1 in FIG. 1. FIG. 2 views from the left side. FIG. 3 views a half left side of the vehicle body viewing from the top, wherein the slide rail 12 is supported by the front and rear suspension units 15 and 16 so that it rocks against the body frame 3 in a vertical direction in response to the relief of the snowy ground.

For the front suspension unit(s) 15, a pair of torque arms 20 is provided in both sides in the center of the cross-direction and along the longitudinal direction of the vehicle body. Front ends of the torque arms 20 are pivotably secured relative to the body frame 3 through an axis 21 that is pivotably supported in the body frame 3. The other ends of the torque arms 20 are pivotably secured relative to the slide rails 12 through an axis 22 that is pivotably supported across the left/right slide rails 12.

In the forward side of the axis 22, another axis 23 is supported across the left/right slide rails 12. Furthermore, (a) cushion unit(s) 24 comprising a coil spring and hydraulic buffer is provided in the center of the cross-direction along the longitudinal direction of the vehicle body.

Namely, one end of the cushion unit(s) 24 is journaled with the other ends of a pair of mount brackets 25 of which one ends are secured in the axis 21 in the center of the axis 21 in the cross-direction. The other end of the cushion unit(s) 24 is journaled with a pair of mount brackets 26 secured in the center of the axis 23 in the cross-direction at the side of the slide rails 12.

Furthermore, each stopper band 27 is provided in each torque arm 20 so that the pivot motion of the torque arms 20 toward the upper direction relative to the slide rails 12 is restricted. One end(s) of the stopper band(s) 27 is/are connected to (a) screw(s) 28 while the other end(s) is/are connected to the axis 23 at the side of the slide rails 12.

The screw(s) 28 connected to one end(s) of the stopper band(s) 27 is/are movably screwed into (a) bracket(s) 29 fixed in the middle of the torque arm(s) 20. With this arrangement, by moving the screw(s) 28 forward or backward against the bracket(s) 29, the restriction applied to a range of the upward pivot motion of the torque arm(s) 20 relative to the slide rail(s) 12, i.e., a descending movement of the slide rail(s) 12 relative to the body frame 3, can be adjusted.

For the rear suspension unit(s) 16, a pair of link mechanisms consisting of link members 31–35 is respectively provided in both left/right sides in the center of the cross-direction along the longitudinal direction of the vehicle body. Relative to this link mechanism, (a) cushion unit(s) 44 consisting of a coil spring and hydraulic buffer is provided in a vicinity of an upper inner side of the track belt 11 in the center of the cross direction of the vehicle body. In addition, a pair of control rods 42 that extend for a certain amount is provided in each end of the link mechanism.

Upper ends of the link members 31 located in the forward side of the link mechanism are fixed in an axis 36 that is pivotably supported in the body frame 3. Thus, the link mechanism of the rear suspension unit 16 is pivotably secured in the body frame 3. Furthermore, lower ends of the link members 31 are connected to a forward end of the link members 32 through an axis 37. Rear ends of the link members 32 are pivotably connected through an axis 39 to lower ends of the link members 33 fixed in an axis 38 that is pivotably supported in the body frame 3.

Furthermore, forward ends of the link members 34 extending to the rear direction are fixed in the axis 38 in which the link members 33 are fixed. Rear ends of the link members 34 are connected to an upper end of the link members 35 through an axis 40 provided across the left/right sides of the link members 34. Lower ends of the link members 35 are pivotably fixed relative to the slide rails 12 through an axis 41 that is pivotably supported in the left/right slide rails 12.

The control rods 42 of the rear suspension unit(s) 16 are expandable for a certain amount, and its expandable amount is adjustable. The forward ends of the control rods 42 are pivotably fixed relative to the axis 38 at the side of the body frame, while the rear end is pivotably fixed in the slide rails 12 by means of an axis 43 (bolt and nut). The control rods 42 are disposed in an up-hill position along the longitudinal direction of the vehicle body. The movement of the link mechanism is restricted within a predetermined certain range depending on the expansion of the control rods 42. Thus, the descending movement of the slide rails 12 relative to the body frame 3 can be restricted within the predetermined range.

A cushion unit(s) 44 of the rear suspension unit(s) 16 is/are disposed in a down-hill position along the longitudinal direction of the vehicle body in a vicinity of the upper inside of the track belt 11 so that at least its upper part is covered by the body frame 3 in a side view in the center of the cross-direction of the vehicle body. The forward end(s) of the cushion unit(s) 44 is/are journaled by a pair of mount brackets 45 secured in the axis 36 at the body frame side. On the other hand, the rear end(s) of the cushion unit(s) 44 is/are journaled by a pair of mount brackets 46 secured across the axis 38 and link member(s) 34.

According to the above suspension units 15 and 16 for the slide rails 12, when the snow mobile 1 is moving, the slide rails 12 guiding the track belt 11 to the contact surface rocks up and down along with the relief of the snowy ground surface. As a result, the slide rails 12 rock relative to the body frame 3 around the axes 21 and 38 at the side of the body frame 3 through the torque arm 20 of the front suspension unit(s) 15 and link mechanisms 31–35 of the rear suspension unit(s) 16.

In this case, in the front suspension unit(s) 15, the rocking motion of the torque art(s) 20 around the axis 21 results in the pivot motion of the axis 21 and mount bracket 25 journaled in the axis 21. The pivot motion of the mount brackets 25 results in the extension/contraction of the cushion unit 24. Thus, by means of damping force generated by the cushion unit 24, an impact applied to the slide rail 12 from the snowy road surface is partially absorbed.

On the other hand, in the rear suspension unit(s) 16, the rocking motion of the link members 34 and 35 of the link mechanism around the axis 38 results in the pivot motion of the mount brackets 46 around the axis 38. Along with the pivot motion of the axis 38, the link members 31 pivot around the axis 36 through the link members 33 and 32. Then, the pivot motion of the link members 31 around the axis 36 results in the contraction/extension of the cushion unit 44 of which both ends are coupled with the mount brackets 45 and 46. Thus, by means of the damping force generated by the cushion unit 44, an impact applied to the slide rail 12 from the snowy road surface is partially absorbed.

If the snow mobile 1 travels on an even road surface, the slide rails 12 properly pitch against the body frame 3 within a contraction/extension range of the control rods 42, the body frame 3 itself does not pitch. Furthermore, it allows to secure the good ground contact for the track belt 11.

Conversely, if the snow mobile 1 passes a localized bumpy road surface, the pitching of the slide rails 12 is limited within the contraction/extension range of the control rods 42, and the pitching of the slide rail 12 exceeding that range is interfered by the control rods 42. Thus, even if the snow mobile 1 is traveling on the localized bumpy surface at a high speed, the pitching of the body frame 3 in response to the large pitching of the slide rail 12 can be restricted.

Furthermore, for each of the left/right slide rails 12, a rear part 12a for supporting the guide wheel 14 is separately provided relative to the main body of the slide rails 12 so that the rear end part of the drive track unit 8 smoothly gets over a projection on the road surface when the snow mobile 1 is moving to the reverse direction. In addition, the rear part 12a is coupled in a manner that it pivots upwardly but it returns to its original position by the force of a screw member.

Figure 4:
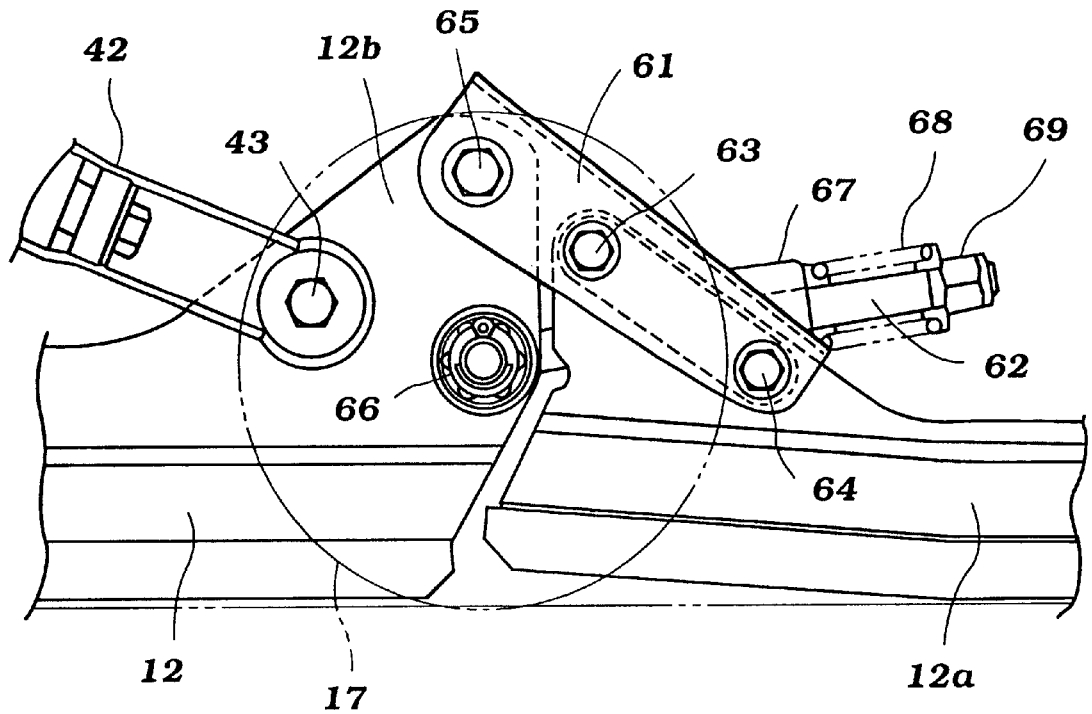
FIG. 4 is a side view illustrating the connection part between the main body and rear part of the slide rail of the snow mobile in FIG. 1.

Namely, as illustrated in FIG. 4, the rear part 12a of the slide rail is pivotably coupled in the upward direction by both of pivot arms 61 and pivot shaft 62 relative to a mount part 12b located in the rear end of the slide rail 12. In the pivot shaft 62, a spring member (coil spring 68) is provided to always force the rear part 12a to its original position (namely, a front end of the rear part 12a approaches the rear end of the main body of the slide rail 12 and a bottom of the rear part 12a forms a substantially same plane with a bottom of the slide rail 12).

Figure 5:
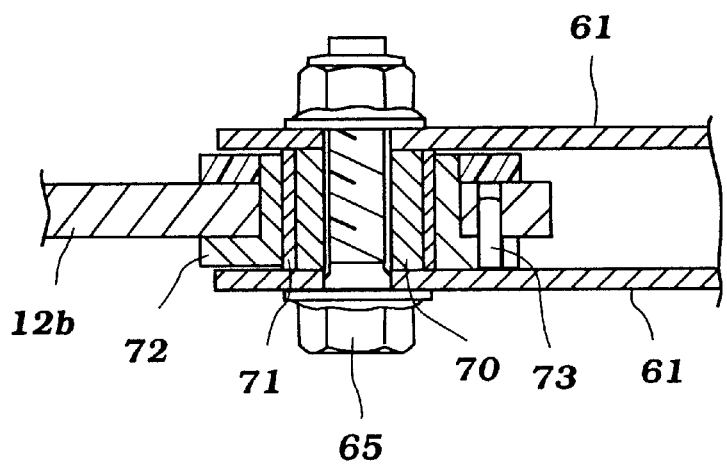
FIG. 5 is a cross-sectional top view partially illustrating the connection part between the main body and rear part of the slide rail of the snow mobile in FIG. 4.

The pivot arms 61 are fixed in the rear part 12a at two places by bolt axes (or nuts) 63 and 64. Front ends of the pivot arms 61 are pivotably coupled relative to an upper side of the mount part 12b by means of a bolt shaft (or nut) 65 through a sleeve 70 and bush 72 into which a bearing 71 is pressed as illustrated in FIG. 5, whereby the bush 72 and mount part 12b are integrated by a pin 73.

As a result, when the pivot arms 61 pivot around the bolt axis 65, a relative movement is given between an outer peripheral surface of the sleeve 70 and inner peripheral surface of the bearing 71. (If the pin 73 is not present, a metallic friction may occur because of slippage between the outer peripheral surface of the bush 72 and mount part 12b when the pivot arms 61 pivot around the bolt axis 65.)

One end of the pivot shaft 62 is pivotably coupled relative to an axis 66 of the idler wheel 17 that is rotatably supported at the lower side of the mount part 12b of the slide rail 12. The center part of the pivot shaft 62 is slidably inserted relative to a shaft support member 67. The pivot shaft 62 is slidably and pivotably supported relative to the rear part 12a of the slide rail 12 because the shaft support member 67 is pivotably supported by the axis 64.

In this pivot shaft 62, the coil spring 68 is provided at a location projecting in the rear direction from the shaft support member 67 as a spring member for forcing the rear part 12a to its original position. A nut 69 is screwed in a rear end of the coil spring 68 as a stopper. The coil spring 68 is located between the shaft support member 67 and nut 69 in a manner that adjusts its spring force.

Figure 6:
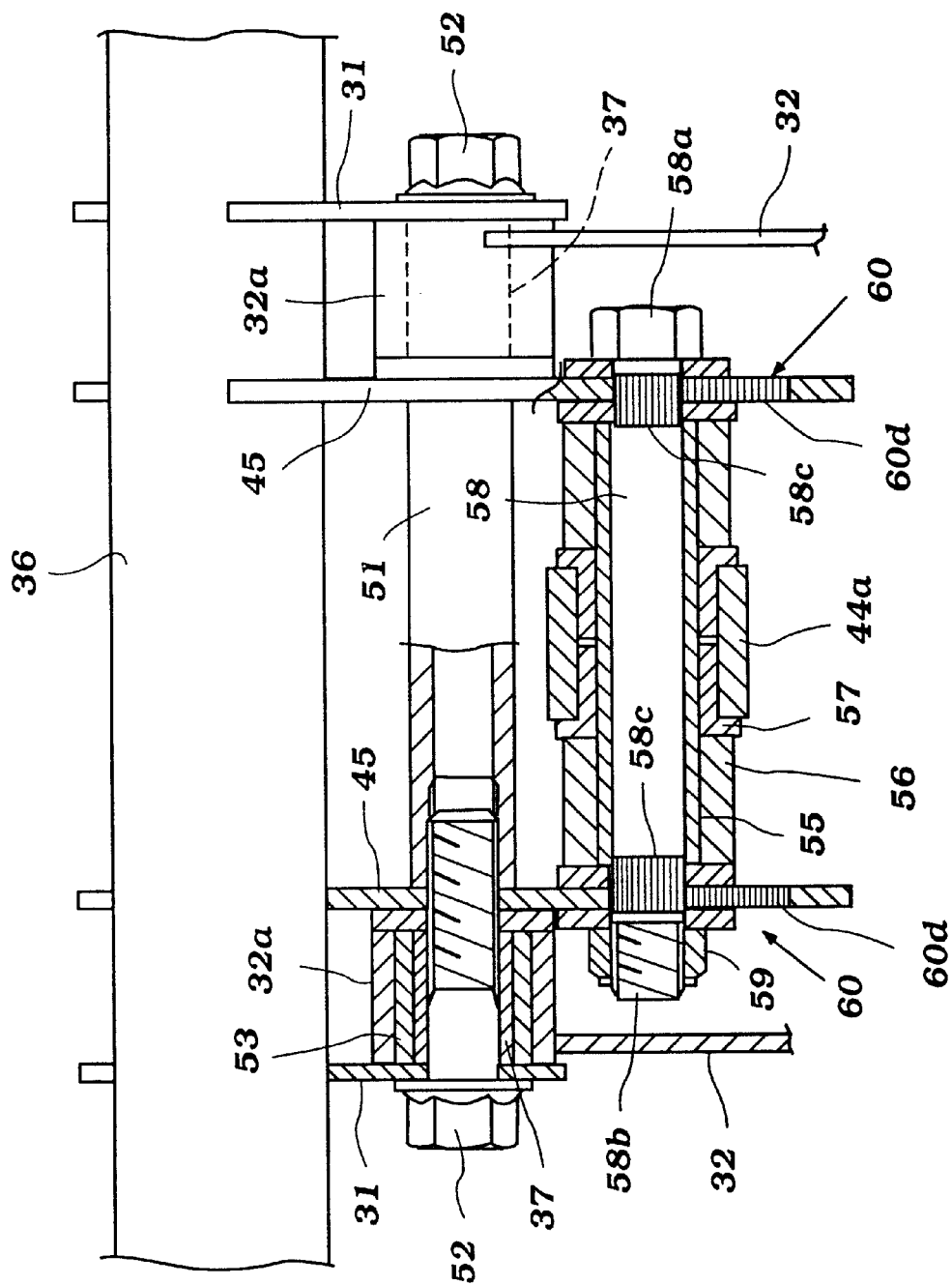
FIG. 6 a partial cross-sectional top view illustrating the front part of the cushion unit in the rear suspension unit as shown in FIG. 3.

FIG. 6 illustrates in details the mount part at the forward side of the cushion unit 44 of the rear suspension unit 16 for the snow mobile 1. In this embodiment, the mounting position for the cushion unit 44 of the rear suspension unit 16 is adjustable at a front end part 44a.

Furthermore, at the external side of the left/right mount brackets 45 in which the front end part 44a is mounted, the left/right link members 31 secured by the axis 36 are respectively disposed in parallel. Axis members (collars) 37 for coupling the link members 31 and 32 are secured between the link members 31 and mount brackets 45 by means of bolts 52 screwed from the outside of the link members 31 into a spacer 51 that is located between the left/right mount brackets 45. Front end parts 32a of the link members 32 are journaled relative to the axis members (collars) 37 through bearings 53.

The front end part 44a of the cushion unit 44 is journaled relative to an axis member (collar) 55 that is fixed between the left/right mount brackets 45 through a bearing member 57 positioned by both spacers 56. The axis member (collar) 55 is secured between the left/right mount brackets 45 by one bolt axis 58 that penetrates a hollow part of the collar 55 by fastening a nut 59 with a screw part 58b that is located in an opposite side from a bolt head 58a.

Figure 7:
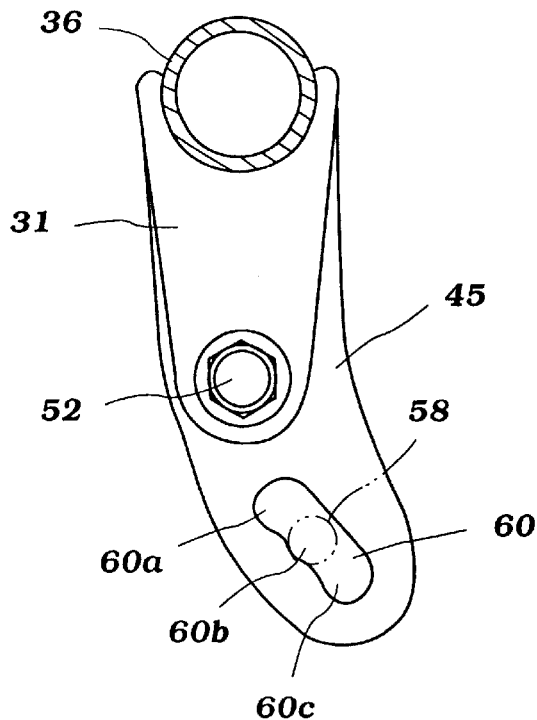
FIG. 7 is a side view illustrating the adjustment guide aperture of the mount bracket at the front end of the cushion unit as shown in FIG. 6.

In each side of the left/right mount brackets 45, each adjustment guide aperture 60 is provided as a mounting hole of the cushion unit for inserting one bolt axis 58 so as to fix the axis member (collar) 55. As illustrated in FIG. 7, the adjustment guide aperture 60 has an elongated shape that extends to a substantially same direction as a circumferential direction around a journal part 47 at the rear side of the cushion unit 44. In each adjustment guide aperture 60, three concave portions 60a, 60b and 60c are formed for positioning the bolt axis 58.

First, the nut 59 is loosened and the bolt axis 58 is slid in the adjustment guide aperture 60. Then, the bolt axis 58 is engaged with either one of the concave portions 60a–60c and the nut 59 is fastened again. With this structure, three-way adjustment of the mounting position for the collar 55 becomes available for supporting the front end 44a of the cushion unit 44.

The cushion unit 44 is located in a vicinity of the upper internal surface of the track belt 11 in a manner that its upper end is covered by the body frame 3 in a side view. On the other hand, the adjustment guide apertures 60 and bolt axis 58 for adjusting the position of the cushion unit 44 are located in the lower side of the body frame 3, facing the side of the vehicle body.

The three-way adjustment for the front end part 44a of the cushion unit 44 in the rear suspension unit 16 allows to adjust reaction force (spring constant) at the rear side of the contact surface of the track belt 11 by changing stroke speed (damper reduction force) of the cushion unit 44 depending on the load weight (weight of passengers or luggage) or driving speed.

Furthermore, in this embodiment with respect to the mount position adjustment structure for the front end part 44a of the cushion unit 44 by using the bolt axis 58 and adjustment guide apertures 60, there is a treatment for each contacting surface between each bolt axis 58 and apertures 60 so as to prevent the skidding of the bolt axis 58 relative to the adjustment guide aperture 60.

Figure 8:
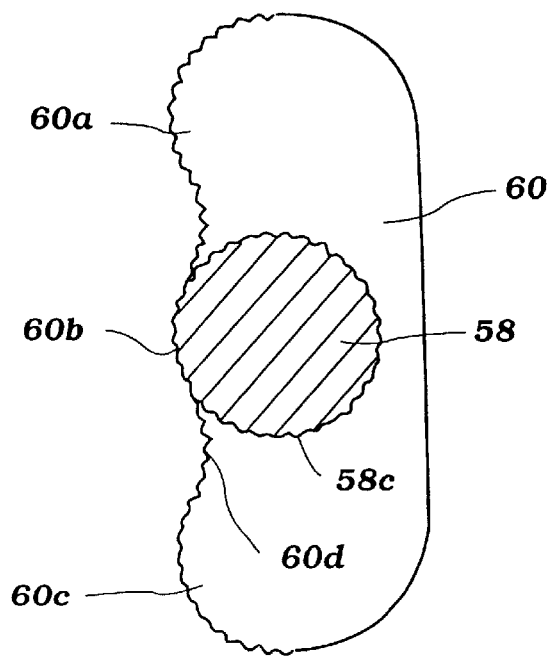
FIG. 8 is a partial cross-sectional side view illustrating the shape of the treatment provided in the contact surface between the adjustment guide aperture and bolt axis in one embodiment of the present invention, as shown in FIG. 7.

Namely, as illustrated in FIG. 8, in both end parts of the bolt axes 58 contacting each inner peripheral wall of a pair of /right adjustment guide apertures 60, a serration 58c is provided in its entire circumference. On the other hand, in the adjustment guide aperture 60, at a side where each concave portion 60a, 60b and 60c is formed, a small groove 60d is provided in the inner peripheral wall of the aperture 60, wherein the small groove 60d is engaged with the serration 58c.

According to the adjustment structure for the cushion unit 44 in this embodiment, the above-described arrangement is given for the contacting area between the bolt axis 58 and guide apertures 60. When the bolt axis 58 is engaged with either one of the concave portions 60a–60c because the compression reaction force of the cushion unit 44 is acting on, first, the nut 59 of the bolt axis 58 is loosened, then, the bolt head 58a is rotated by a tool so as to rotate the bolt axis 58 in a desired direction. Since the serration 58c of the bolt axis 58 and groove 60c of the aperture 60 are engaged, the bolt axis 58 can be easily moved along the inner peripheral wall of the guide aperture 60.

Furthermore, in this embodiment, the cushion unit(s) 44 of the rear suspension unit(s) 16 for suspending the slide rail(s) 12 of the snow mobile 1 is/are located in a vicinity of the upper inside of the track belt 11, the bolt axis 58 (and adjustment guide apertures 60) for adjusting the mounting position of the front end(s) 44a of the cushion unit(s) 44 is distanced from the snowy ground surface. Since a space is formed between the bolt axis 58 and bottom side (contact surface side) of the track belt 11, the bolt axis 58 is hardly covered by the snow. Moreover, since the adjustment guide apertures 60 and bolt axis 58 are located in the lower side of the body frame 3 and arranged to face the body side, the efficiency for adjusting the mount position for the cushion unit(s) 44 can be improved.

Figure 9:
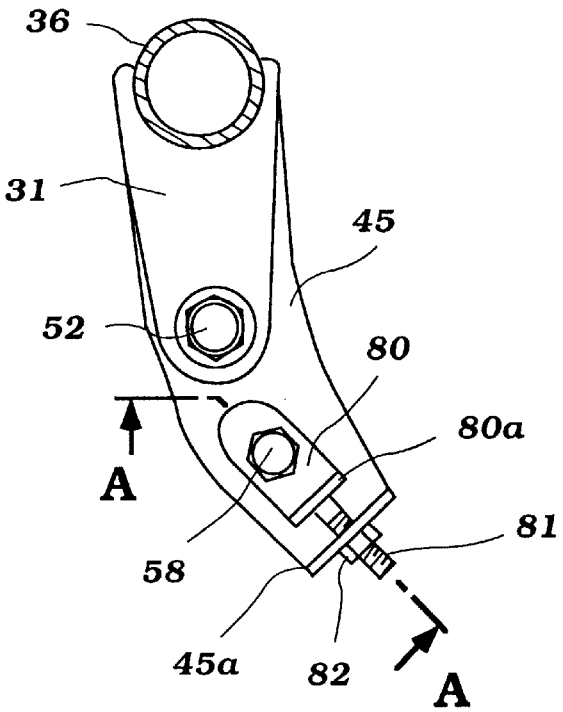
FIG. 9 is a side view illustrating a compared example of the adjustment structure in which the mounting position at the front part of the cushion unit is adjusted within the range of the adjustment guide aperture.
Figure 10:
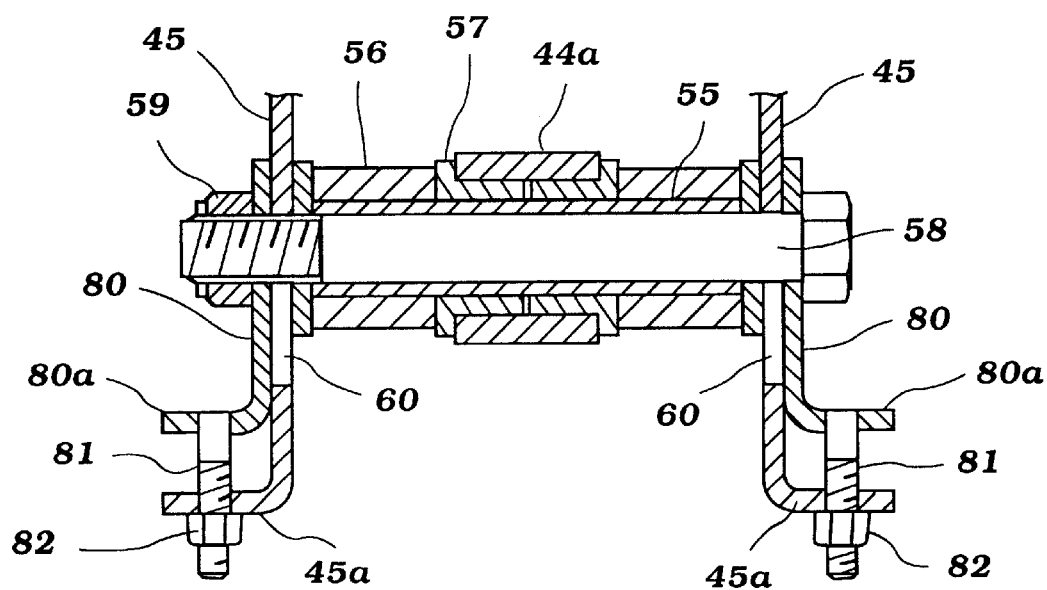
FIG. 10 is a cross-sectional view cut along a line A-A illustrating the adjustment structure as shown in FIG. 9.

Furthermore, with respect to the mounting position adjustment structure for the cushion unit(s) 44 in the rear suspension unit(s) 16 for suspending the slide rails 12 of the snow mobile 1, if there is no such arrangement such as the serration 58c and groove 60d provided as described in the foregoing, it is very difficult to maneuver the location of the bolt axis 58 that is engaged in either one of the concave portions (60a–60c). In fact, an operator has to move the bolt axis 58 to other location by applying pressure to a direction against the compression reaction force of the cushion unit(s) 44 and shifting the bolt axis 58 to other concave portion while keeping the pressure In order to solve the above-described problem, Patent Applicant is considering to modify the mounting position adjustment structure for the front end part(s) 44a of the cushion unit(s) 44 within a range of the adjustment guide apertures 60. As illustrated in FIGS. 9 and 10, each axis hold member 80 is provided for each mount bracket 45 that is movable along each adjustment guide aperture 60. The bolt axis 58 for supporting the front end part(s) 44a is supported through the adjustment guide apertures 60 and axis hold members 80. The axis hold members 80 move along the adjustment guide apertures 60, whereby the mounting position for the front end part(s) 44a of the cushion unit(s) 44 is adjusted.

Specifically, flange parts 45a are formed in the mount brackets 45 in which the adjustment guide apertures 60 are formed. In addition, flange parts 80a are formed in the axis hold members 80. The axis hold members 80 are coupled with the mount brackets 45 by movably inserting adjustment bolts 81 that are fixed in the flange parts 80a into the flange parts 45a of the mount brackets 45 and fastening nuts 82 respectively. Then, the nut 59 of the bolt axis 58 is loosened, and each nut 82 of each adjustment bolt 81 is rotated at each left/right side. The bolt axis 58 is moved along the adjustment guide apertures 60 along with the axis hold members 80. After the position of the bolt axis 58 is adjusted, its position is secured by fastening the nut 59.

Figure 11:
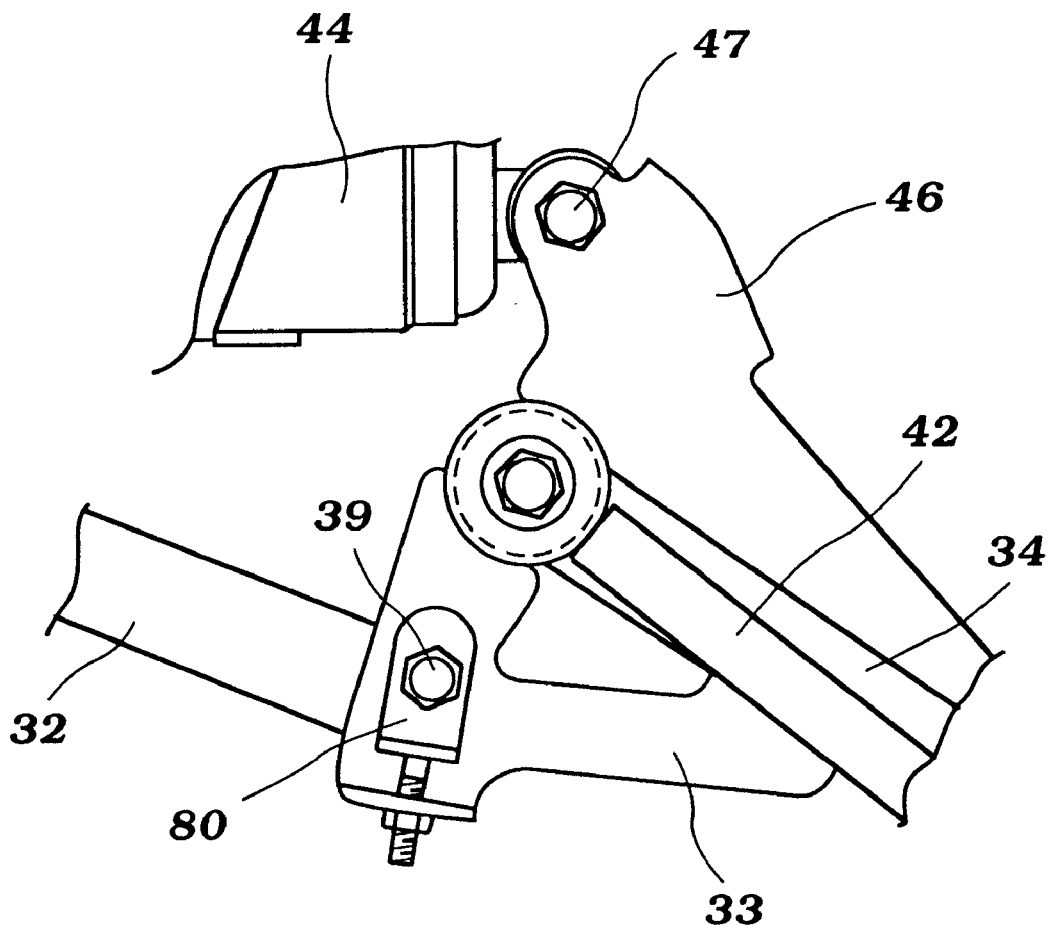
FIG. 11 is a side view illustrating the adjustment structure in FIG. 9 that is applied to other part.

Furthermore, the adjustment of the spring constant (reaction force) at the contact surface of the track belt 11 is not necessary limited to the positional adjustment for the bolt axis that supports the front end part(s) 44a of the cushion unit(s) 44, as illustrated in FIGS. 9 and 10. In fact, an arrangement as illustrated in FIG. 11 can be also employed, wherein the position of an axis member 39 that couples the rear end part of the link member 32 and the lower part of the link member 33 is adjustable. It is possible to provide such a position adjustment mechanism in both of the bolt axis 58 and axis member 39, or for either one of them. Furthermore, a specific structure for the axis hold members 80 that move along the adjustment guide apertures 60 can be also modified at any time.

According to the above-discussed position adjustment mechanism by means of the axis hold members 80, the spring constant (reaction force) at the contact surface of the track belt 11 is easily adjustable only by moving the axis hold members 80 along the adjustment guide apertures 60. Furthermore, such position adjustment mechanism is located in the lower side of the body frame 3 facing the side of the vehicle body, allowing to improve the efficiency of the positional adjustment.

In comparison with such position adjustment mechanism utilizing the movable axis hold members 80, the adjustment structure of the cushion unit(s) 44 in the preferred embodiment in the present invention in which the above-described arrangement is provided in the contact surface between the bolt axis 58 and adjustment guide apertures 60, does not require other parts such as the axis hold members 80, allowing a simple arrangement. Thus, the adjustment of the mounting position can be achieved by simply rotating the bolt axis 58.

In the foregoing, one embodiment regarding the adjustment structure for the cushion unit in the present invention has been explained. The present invention is not necessarily limited to the cushion unit of the suspension unit for the snow mobile but also applicable to the cushion unit for other purposes.

Furthermore, with respect to the specific structure, for example, the location of the adjustable mounting part for the cushion unit(s) is not necessarily limited to the front end of the cushion unit. It can be located in the rear mounting part or the mounting parts in both sides. Moreover, the arrangement given to the contact surface between the bolt axis and adjustment guide apertures, if the treatment can prevent the skidding of the bolt axis, it is not necessarily limited to the serration 58c and groove 60d as described in the present invention.

EFFECTS OF THE PRESENT INVENTION

According to the above-discussed cushion unit adjustment structure in the present invention, even if the compression reaction force is applied to the mount part of the cushion unit, relative to the bolt axis for securing the axis with which the end part of the cushion unit is journaled, the mounting position of the cushion unit can be easily adjusted by a simple task wherein the nut of the bolt axis is loosened and the bolt head is rotated by a tool, even by taking advantage of the compression reaction force.

What is claimed is:

1. A snowmobile drive belt suspension system for cushioning the movement of a drive belt guide rail relative to a body frame of said snowmobile, said suspension system comprising a cushion unit for cushioning relative movement of said drive belt guide rail and said body frame and a linkage system for controlling such movement and for loading said cushion unit, an adjustment structure for adjusting the relationship of said cushion unit and said linkage system comprising an axle member for supporting an end part of said cushion unit relative to a mount bracket defining at least one adjustment guide aperture for receiving said axle member so that a position of said cushion unit is adjustable, and a surface treatment on a contact surface between said adjustment guide aperture and axle member for resisting the shifting of said axle member within to said adjustment guide aperture under the compression reaction force of said cushion unit.

2. A snowmobile drive belt suspension system of claim 1, further characterized that said drive belt guide rail is suspended by means of front and rear suspension units relative to the body frame and located on an upper side of said drive belt guide rail, and said cushion unit being associated with said rear suspension unit and located in a vicinity of an upper inner side of a drive belt engaged with said drive belt guide rail.

3. A snowmobile drive belt suspension system of claim 2, wherein, in a side view, said cushion unit is located in a vicinity of the upper inner side of said track belt so that at least an upper side of said cushion unit is covered by said body frame, and said adjustment guide aperture and said axle member for adjusting the position of said cushion unit are located in the lower side of said body frame and arranged to face the side of said body frame.

4. A snowmobile drive belt suspension system of claim 1 wherein the surface treatment on the contact surface between the adjustment guide aperture and the axle member comprises a roughening of the surface of one of the mount brackets defining the guide aperture and the axis member.

5. A snowmobile drive suspension system of claim 4 wherein both of the axis member and mount bracket are roughened.

6. A snowmobile drive belt suspension of claim 1 wherein the mount bracket comprises a pair of spaced apart mount brackets each defining respective adjustment guide apertures and the axis member comprises a bolt extending through said guide apertures in said mount brackets and fixed axially relative to said mount brackets by a nut fastened to one side thereof.

* * * * *